(12) United States Patent
Baur et al.

(10) Patent No.: US 9,073,506 B2
(45) Date of Patent: Jul. 7, 2015

(54) VEHICLE HAVING A SEAT BELT SYSTEM

(75) Inventors: Elmar Baur, Wahrenholz (DE); Marcus Voigt, Berlin (DE); Helmut Walter, Cremlingen (DE)

(73) Assignee: Volkswagen AG, Wolfsburg (DE)

( * ) Notice: Subject to any disclaimer, the term of this patent is extended or adjusted under 35 U.S.C. 154(b) by 51 days.

(21) Appl. No.: 13/607,978

(22) Filed: Sep. 10, 2012

(65) Prior Publication Data

US 2013/0024074 A1 Jan. 24, 2013

Related U.S. Application Data

(63) Continuation of application No. PCT/EP2011/000694, filed on Feb. 15, 2011.

(30) Foreign Application Priority Data

Mar. 8, 2010 (DE) .......................... 10 2010 010 613

(51) Int. Cl.
*B60R 22/48* (2006.01)
*B60R 22/02* (2006.01)
*B60N 2/68* (2006.01)

(52) U.S. Cl.
CPC .............. *B60R 22/023* (2013.01); *B60N 2/688* (2013.01); *B60R 22/48* (2013.01); *B60R 2022/028* (2013.01); *B60R 2022/485* (2013.01)

(58) Field of Classification Search
CPC ........ B60R 22/00; B60R 21/00; B60R 11/00; B60N 2/00
USPC ............... 701/1, 46, 49, 99; 297/362, 354.12, 297/463.1, 367, 317
See application file for complete search history.

(56) References Cited

U.S. PATENT DOCUMENTS

| | | | |
|---|---|---|---|
| 6,065,776 A * | 5/2000 | Toyota et al. ............... 280/801.1 |
| 6,203,059 B1 * | 3/2001 | Mazur et al. .................. 280/735 |
| 6,728,616 B1 * | 4/2004 | Tabe ............................... 701/45 |
| 7,296,825 B1 | 11/2007 | Zia et al. |
| 7,780,230 B2 * | 8/2010 | Serber ....................... 297/216.15 |
| 7,812,716 B1 * | 10/2010 | Cotter ......................... 340/457.1 |
| 7,874,590 B1 * | 1/2011 | Schubert et al. .............. 280/806 |
| 2004/0068354 A1 * | 4/2004 | Tabe ............................... 701/45 |
| 2004/0119599 A1 * | 6/2004 | Stevenson et al. .......... 340/686.1 |
| 2004/0150212 A1 * | 8/2004 | Russell et al. ................. 280/808 |
| 2006/0138797 A1 * | 6/2006 | Wang et al. .................. 296/68.1 |
| 2007/0205884 A1 * | 9/2007 | Federspiel et al. ......... 340/457.1 |

(Continued)

FOREIGN PATENT DOCUMENTS

| | | |
|---|---|---|
| DE | 101 36 267 A1 | 2/2002 |
| DE | 20 2005 020 592 U1 | 8/2006 |
| DE | 10 2005 041376 A1 | 3/2007 |

(Continued)

*Primary Examiner* — John R Olszewski
*Assistant Examiner* — Truc M Do
(74) *Attorney, Agent, or Firm* — Muncy, Geissler, Olds & Lowe, P.C.

(57) ABSTRACT

A vehicle is provided that includes at least one vehicle seat, which has a backrest, the inclination of which can be adjusted, and a control device, by means of which the backrest can be controlled to a lying position having a greater angle of inclination at the request of a seat user. The control device has a signal connection to a monitoring device, which detects at least one belt parameter, by means of which it can be determined whether a flawless belt course of a safety belt being worn by a seat user is ensured in the lying position.

15 Claims, 3 Drawing Sheets

(56) References Cited

U.S. PATENT DOCUMENTS

2009/0031541 A1* 2/2009 Pribonic .................... 24/603
2010/0182425 A1* 7/2010 Sakakida et al. ............ 348/135

FOREIGN PATENT DOCUMENTS

DE    10 2008 042 399 A1    4/2010
EP         0 940 305 A2     9/1999

* cited by examiner

VEHICLE HAVING A SEAT BELT SYSTEM

This nonprovisional application is a continuation of International Application No. PCT/EP2011/000694, which was filed on Feb. 15, 2011, and which claims priority to German Patent Application No. DE 10 2010 010 613.5, which was filed in Germany on Mar. 8, 2010, and which are both herein incorporated by reference.

BACKGROUND OF THE INVENTION

1. Field of the Invention

The invention relates to a vehicle with a seat belt system and a method for tilt adjustment of a backrest of a vehicle seat. The backrest of a front passenger seat can be controlled electromotively by means of an electronic control device, by which also the backrest can be brought into different tilt positions.

2. Description of the Background Art

A generic vehicle has a front passenger seat with an electrically tilt-adjustable backrest. The backrest of the front passenger seat can be adjusted at the request of a seat occupant with the aid of an electronic control device from a normal position with a smaller tilt angle to a recumbent position with a greater tilt angle.

Such a tilt adjustment to the recumbent position is possible without safety problems in the case of so-called integral seats, because the associated seat belt is connected directly to the vehicle seat at least in the shoulder region of the backrest. In the case of a tilt adjustment, therefore, the connecting point located in the shoulder region is automatically pivoted concurrently, so that with a fastened seat belt a proper belt route over the seat occupant is assured in the recumbent position of the vehicle seat as well.

In contrast to such an integral seat, the seat belt for the front passenger seat can also be connected in the pelvic region and in the shoulder region directly on the body side to the vehicle pillar. In this case, the seat belt cannot follow a tilt adjustment of the backrest but remains unchanged. As a result, for the front passenger seat, a no longer proper belt route with a fastened seat belt results in the recumbent position. This can lead to safety problems during vehicle operation.

SUMMARY OF THE INVENTION

It is therefore an object of the invention to provide a vehicle with a seat belt system, in which safety problems in the recumbent position of the vehicle seat can be prevented without use of an integral seat.

According to an embodiment, a control device has a signal connection to a monitoring device. It can detect at least one belt parameter, which can be used to determine whether a proper belt route is assured in the recumbent position of the vehicle seat with a fastened seat belt. In the case that the monitoring device does not determine a proper belt route, suitable safety measures can therefore be brought about by the control device.

The invention can be used in particular in electrically adjustable vehicle seats in which the electronic control device can control the backrest electromotively. In this case, the seat occupant can select a recumbent position with a greater tilt angle, for instance, by pressing a corresponding button. Before the start of the adjusting movement to the recumbent position, the monitoring device can then detect the belt parameter used as the basis for determining whether a proper belt route can be assured in the recumbent position.

In determining a proper belt route, the monitoring device can generate a release signal, which is sent to the electronic control device. Only after receiving the release signal can the control device then begin or continue the adjustment actuation to the recumbent position.

The belt parameter detected by the monitoring device can also indicate a faulty belt route in the recumbent position. In this case, no release signal is sent to the electronic control device, so that an adjustment actuation of the backrest to the recumbent position is prevented for safety reasons.

The vehicle seat can be integrated as a front passenger seat in a seat belt arrangement, which includes a front seat belt and a rear seat belt. The front seat belt in this case can be a conventional three-point seat belt, for which connecting points directly to the vehicle pillar are provided in the shoulder and pelvic region. The front belt can be used in a customary manner in a normal, i.e., elevated sitting position of the front passenger seat. The rear belt can also be used at least in the recumbent position. Therefore, based on its arrangement in the rear region, a route of the shoulder belt, favorable in regard to safety, toward the back is assured, namely, depending on the set tilt of the front passenger seat.

The monitoring device can detect as a belt parameter a belt actuation of the rear belt or the front belt by the seat occupant of the front passenger seat. Therefore, if the electronic control device receives a request for a tilt adjustment to the recumbent position, the monitoring device will check first whether the seat occupant of the front passenger seat has or has not used the rear belt provided for this. Only when the rear belt has been used can the safety device then adjust the front passenger seat to the recumbent position. The monitoring device can therefore have at least one sensor element that detects whether the front belt or the rear belt is fastened for the seat occupant of the front passenger seat.

In the aforementioned safety arrangement, when the front passenger seat is in use, not only the front belt but also the rear belt of the vehicle seat disposed behind it can be used. To assure a proper belt route during use of the rear belt, the rear belt may have an adjustable belt end fitting in the vehicle longitudinal direction. This can be adjusted for use on the front passenger seat from its rear end fitting position to a front end fitting position, as a result of which a proper belt route in the pelvic region of the front passenger seat is assured.

The monitoring device may also have a sensor element, which can detect the end fitting of the rear belt in its front end fitting position. In an embodiment, the end fitting of the rear belt may be a belt tongue, which in each case can engage in an end fitting receptacle of the rear seat or an end fitting receptacle of the front passenger seat. In this case, the sensor element can be disposed directly in the end fitting receptacle of the front passenger seat and be made as a switch, which generates a switching signal upon insertion of the end fitting belt tongue.

The monitoring device may have another sensor element, which detects whether the seat occupant of the front passenger seat is buckled in. The sensor element can also be disposed as a switch in the buckle receptacle of the front passenger seat and can detect by actuation of the receptacle that the seat occupant is buckled in.

Moreover, for reasons of safety it should be checked whether the seat belt fastened by the front seat occupant is in fact the rear belt, to release the adjustment actuation to the recumbent position. To this end, the monitoring device may have a third sensor element, which detects whether the front belt has been actuated or not. The sensor element can detect a belt extension length of the front belt.

With the aforementioned first to third sensor elements, therefore, three queries can be answered, namely, first whether the rear belt with its end fitting is in the front region, secondly whether the seat occupant of the front passenger seat is buckled in, and thirdly whether the seat belt in use is in fact the rear belt and not the front belt. Only when these queries have a positive answer can the monitoring device generate the aforementioned release signal.

For reasons of safety, a circumstance is also important in which the rear belt is buckled in the case of when the front passenger seat is already brought into the recumbent position. It is advantageous in this case if the control device generates at least one warning signal. In addition, the control device can adjust the backrest also to a normal position with a smaller tilt angle to reduce possible safety problems.

In another circumstance, the seat occupant in the recumbent position of the front passenger seat may change from the rear belt to the front belt. In this case as well, the control device can produce a warning signal and/or adjust the backrest to a normal position with a smaller tilt angle.

One of these three queries can also be omitted if necessary. Thus, for instance, the sensor element that detects the end fitting of the rear belt in its front end fitting position can be omitted, because the seat occupant can readily detect an improper use of the end fitting belt tongue of the rear belt.

In addition, the end fitting belt tongue and/or the buckle belt tongue can be provided with an additional coding that can be recognized by the sensor element of the end fitting receptacle and/or buckle receptacle. In this case, the aforementioned belt unbuckling sensor could possibly be omitted.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus, are not limitive of the present invention, and wherein.

DETAILED DESCRIPTION

Figure 1:
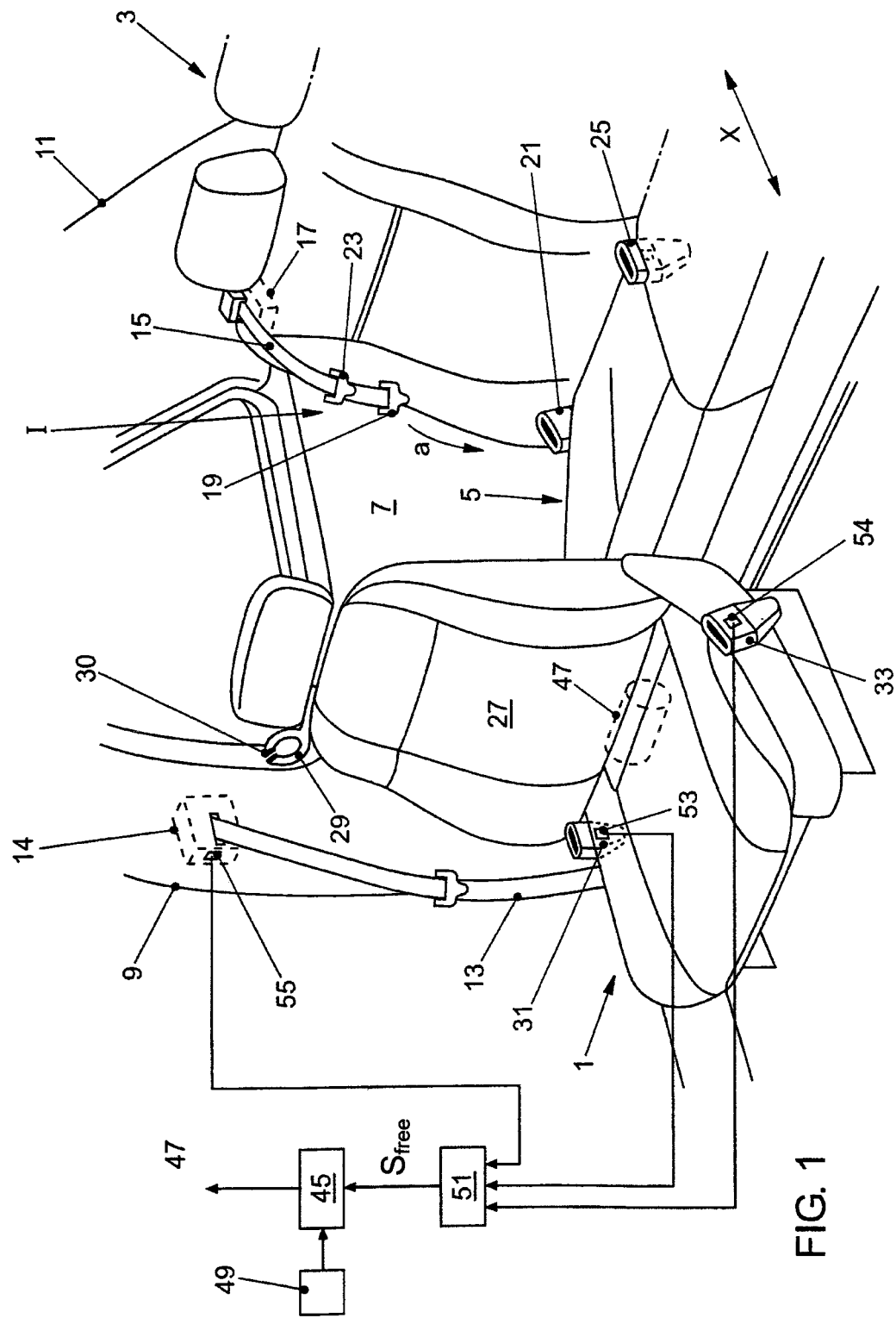
FIG. 1 in a partially perspective view shows a vehicle interior with a front passenger seat and a rear row of seats disposed behind it.

In FIG. 1, in a schematic diagram a section of a vehicle interior is shown with a front passenger seat 1 and a rear row of seats 3, of which only the right outer rear seat 5 is shown. The vehicle interior according to FIG. 1 is bounded by a vehicle side wall 7, which is shown only in part in the area between B-pillar 9 and C-pillar 11. Vehicle side wall 7 at the top merges into a likewise not shown vehicle roof.

As is evident further from FIG. 1, a front belt 13 is connected to B-pillar 9. The belt with its upper belt end is wound in a retractor 14 and with its bottom belt end fixed to a body-side end fitting, which is not shown further. A seat belt 15 is also associated with rear seat 5. Its upper belt end is wound in a retractor 17 integrated into rear seat 5. The bottom belt web end of rear belt 15 has an end fitting belt tongue 19, which is described further below and is locked in place in end fitting 21 configured as a receptacle.

To lock rear belt 15 in its lower end fitting 21, according to FIG. 1, its end fitting belt tongue 19 is inserted in end fitting receptacle 21 in a direction of movement a. In this way, a rear fastening position I, labeled in FIG. 1 with I, is provided in which a seat occupant of rear seat 5 can fasten rear belt 15 in a known manner.

In fastening position I, rear seat belt 15 is guided along a side wall of the backrest of rear seat 5 downward to end fitting receptacle 21. Another, slidably disposed buckle belt tongue 23 is provided between lower end fitting belt tongue 19 and upper retractor 17. The tongue can be fixed removably for fastening seat belt 15 in a known manner over the seat occupant in the corresponding buckle receptacle 25. Buckle receptacle 25 is disposed in the vehicle transverse direction on the side of vehicle seat 5, the side opposite to the end fitting receptacle 21.

As is further evident from FIG. 1, front passenger seat 1 at the top side of backrest 27 has a belt redirecting element 29. It is positioned on a side facing vehicle side wall 7.

Figure 2:
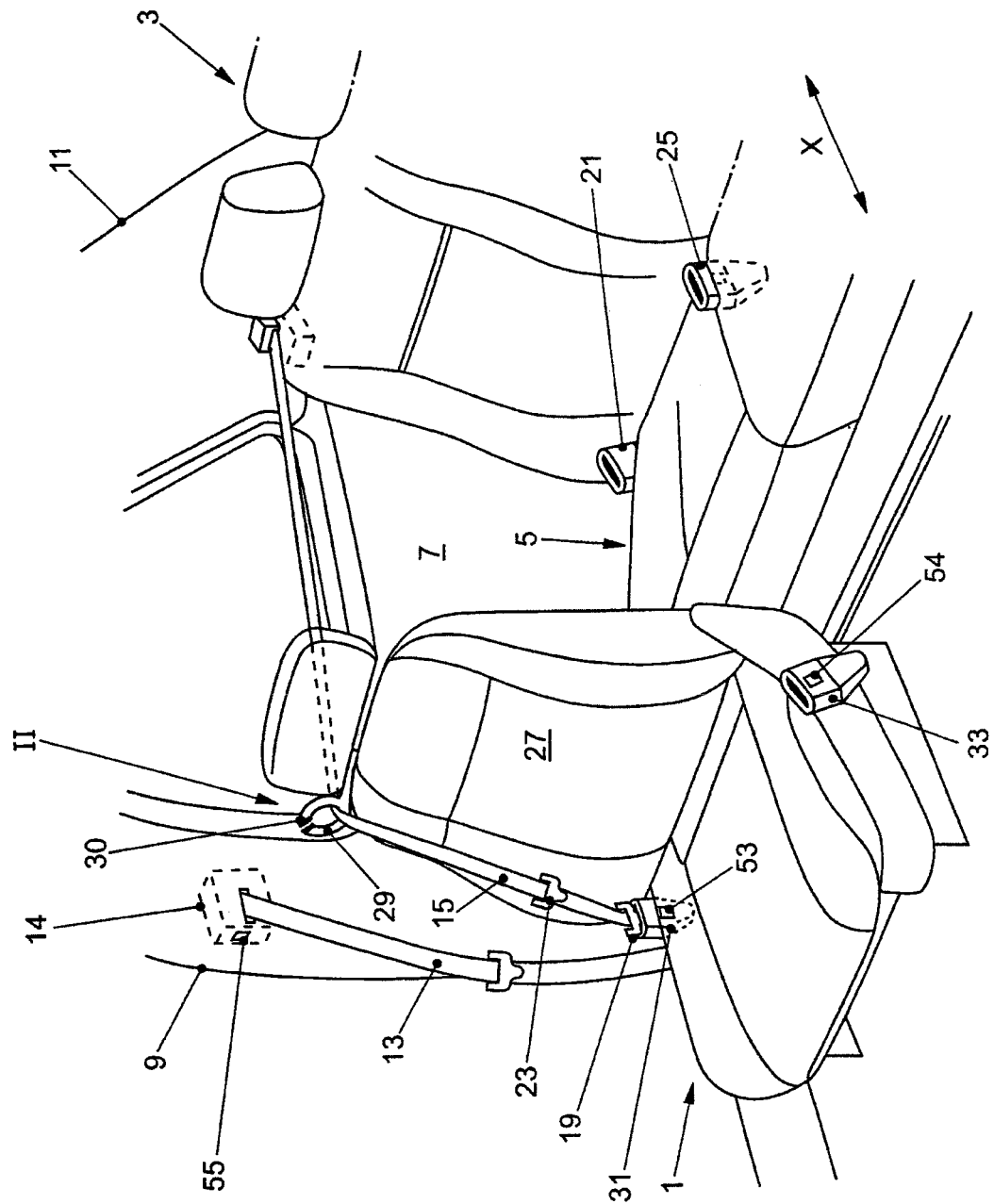
FIG. 2 in a view according to FIG. 1 shows the rear seat belt in its front fastening position.

Belt redirecting element 29 is configured with a laterally open guide slot 30, in which rear seat belt 15 can be inserted, as is necessary for creating a front fastening position II, shown in FIG. 2, of rear seat belt 15.

In order to bring rear seat belt 15 into its front fastening position II, shown in FIG. 2, front passenger seat 1 is assigned receptacles 31, 33 disposed on the side. Receptacle 31 facing vehicle wall 7 is used in this case as an end fitting receptacle, in which end fitting belt tongue 19 of rear seat belt 15 can be inserted. The belt tongue 23 slidable along the belt web can be inserted in side buckle receptacle 33, lying opposite in the vehicle transverse direction, in order to fasten rear seat belt 15.

In order to provide this second fastening position II, end fitting belt tongue 19 of rear seat belt 15 is first removed from end fitting receptacle 21. Next, seat belt 15 is placed in redirecting element 29 and end fitting belt tongue 19 is placed removably in front end fitting 21. The actual front seat belt 13 remains unused.

Figure 3:
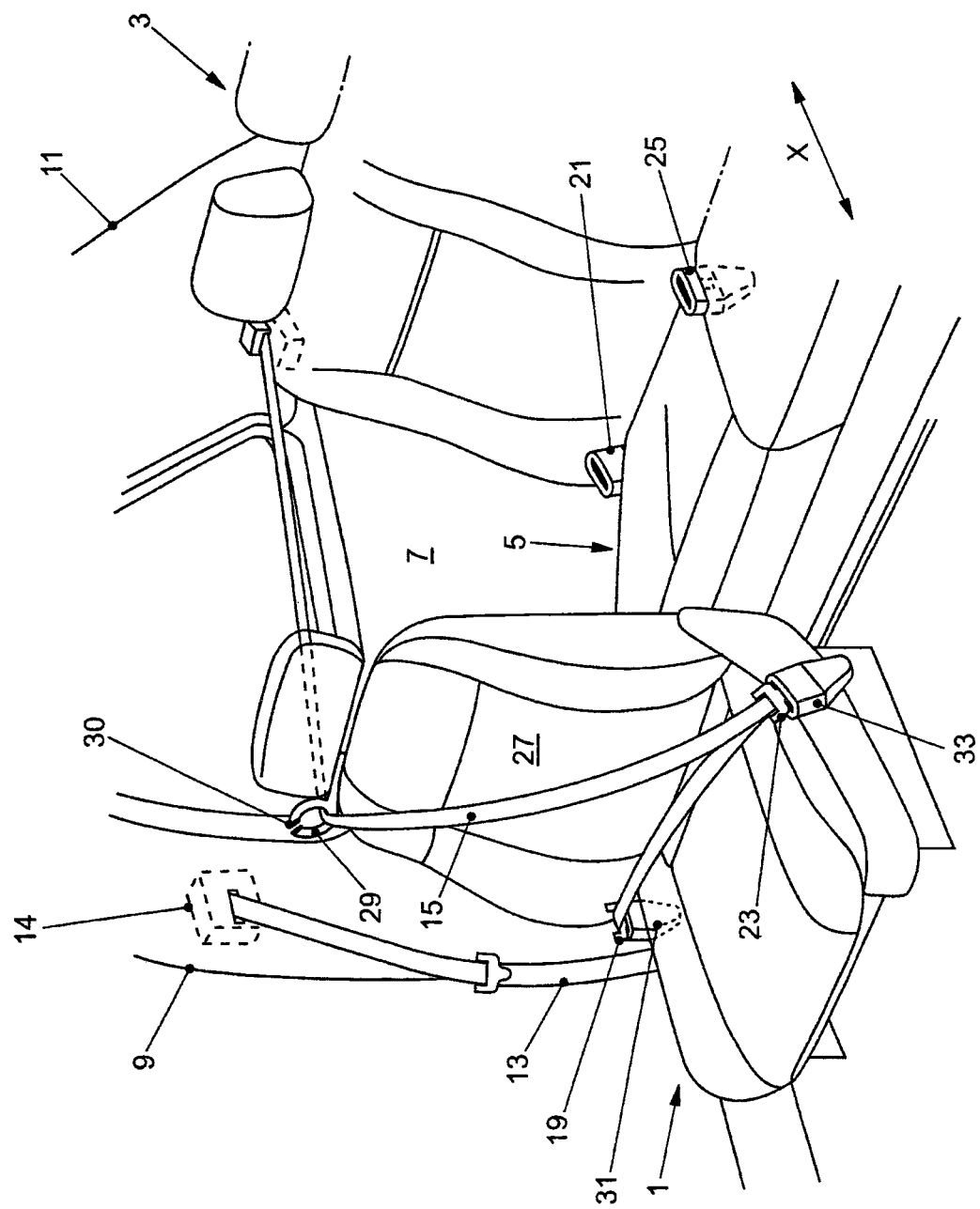
FIG. 3 in a view according to FIGS. 1 and 2 shows a seat occupant of the front passenger seat with a fastened rear seat belt.

Additionally, in FIG. 3, the route of rear belt 15 is shown, when it is fastened by the seat occupant of front passenger seat 1. It becomes evident here that seat belt 15 runs starting from the shoulder region of front passenger seat 1 approximately horizontally backward into the rear region. This horizontal route in the rear region can be retained more or less even in a tilt adjustment of backrest 27 to a recumbent position, as a result of which an optimal belt route in the shoulder area is always assured. In addition, according to FIG. 3, the lower end fitting of the rear seat belt 15 is also displaced in the front area, as a result of which the lower fastening point in the pelvic region also lies in such a way that there is a proper belt route in the pelvic area.

Provided no recumbent position of front passenger seat 5 is intended, rear seat belt 15 can again be brought into its rear fastening position I, shown in FIG. 1. In this case, during vehicle operation the actual front seat belt 13 can be fastened, because no tilt adjustment of backrest 27 to a recumbent position is expected.

Front passenger seat 1, shown in FIGS. 1 to 3, can be controlled electromotively by means of an electronic control device 45 indicated in FIG. 1, in order to adjust the tilt of backrest 27. To this end, electronic control device 45 has a signal connection with an indicated dc motor 47, which during activation sets the tilt angle of backrest 27. To this end, the seat occupant can select different tilt positions in an input unit 49.

Electronic control device 45 in addition has a signal connection to a monitoring device 51, which detects a belt parameter, with which before the start of the adjustment actuation to the recumbent position it can be determined whether presumably a proper belt route is or is not assured in a fastened seat belt. To this end, the monitoring device has sensor elements 53, 54, 55, with which belt parameters are generated on the basis of which monitoring device 51 can determine whether the seat occupant of front passenger seat 1 has fastened front belt 13 or rear belt 15. To this end, first sensor element 53 is disposed as a switch in the front end fitting receptacle 31. During actuation of the front end fitting receptacle 31 by end fitting belt tongue 19 of rear belt 15, a corresponding notification of monitoring device 51 takes place that rear belt 15 is in its front fastening position II, which is shown in FIG. 2.

The second sensor element 54 is also disposed as a switch in front buckling receptacle 33. During an actuation of receptacle 33, a corresponding notification of monitoring device 51 takes place, according to which at least one of seat belts 13, 15 has been fastened by the seat occupant of front passenger seat 1.

To assure that the fastened seat belt is rear belt 15, third sensor element 55 is provided in retractor 14 of front belt 13. A belt extension length of retractor 14 can be determined with third sensor element 55. If this is 0, monitoring device 51 recognizes that seat belt 13 has not been actuated. Consequently, it can be concluded that the seat belt buckled by front passenger seat occupant is rear belt 15. If there are positive notifications from all sensor elements 53, 54, 55, monitoring device 51 generates a release signal $S_{free}$, as a result of which an adjustment actuation of front passenger seat 1 to the recumbent position is released.

The invention being thus described, it will be obvious that the same may be varied in many ways. Such variations are not to be regarded as a departure from the spirit and scope of the invention, and all such modifications as would be obvious to one skilled in the art are to be included within the scope of the following claims.

What is claimed is:

1. A vehicle comprising:
   at least one vehicle seat with a tilt-adjustable backrest;
   a control device with which at a request of a seat occupant the backrest is controllable to a recumbent position with a greater tilt angle; and
   a monitoring device having a signal connection to the control device, the monitoring device configured to detect at least one belt parameter that is used to determine whether a proper belt route of a seat belt fastened to the seat occupant is assured in the recumbent position,
   wherein, in determining a proper belt route, the monitoring device releases or prevents an adjustment actuation of the backrest to the recumbent position.

2. The vehicle according to claim 1, wherein a sensor element of the monitoring device detects whether the buckle receptacle provided for buckling of the seat belt of the front vehicle seat has been actuated.

3. A vehicle comprising:
   at least one vehicle seat with a tilt-adjustable backrest;
   a control device with which at a request of a seat occupant the backrest is controllable to a recumbent position with a greater tilt angle; and
   a monitoring device having a signal connection to the control device, the monitoring device configured to detect at least one belt parameter that is used to determine whether a proper belt route of a seat belt fastened to the seat occupant is assured in the recumbent position,
   wherein the vehicle seat is a front vehicle seat and is assigned a seat belt arrangement, which has a front seat belt and a rear seat belt, and wherein to achieve a proper belt route in the recumbent position, the rear seat belt is adapted to be fastened to the seat occupant of the front vehicle seat.

4. The vehicle according to claim 3, wherein the monitoring device detects as a belt parameter, a belt actuation of the rear seat belt by the seat occupant of the front vehicle seat.

5. The vehicle according to claim 3, wherein the monitoring device has at least one sensor element, which detects whether the front or rear seat belt is fastened to the seat occupant of the front vehicle seat.

6. The vehicle according to claim 3, wherein the rear seat belt has a belt end fitting adjustable in a vehicle longitudinal direction, which for the use of the rear seat belt on the front vehicle seat is adjustable from a rear end fitting position to a front end fitting position.

7. The vehicle according to claim 6, wherein a sensor element of the monitoring device detects the end fitting of the rear seat belt in the front end fitting position.

8. The vehicle according to claim 3, wherein a sensor element of the monitoring device detects whether the front seat belt has been actuated, and wherein the sensor element detects a belt extension length of the front seat belt.

9. The vehicle according to claim 8, wherein the monitoring device releases the adjustment actuation of the vehicle seat to the recumbent position, when the first sensor element recognizes that the rear seat belt is in its front end fitting position, and when the second sensor element recognizes an actuation of the buckle receptacle of the front vehicle seat, and when the third sensor element recognizes a non-actuation of the front seat belt.

10. The vehicle according to claim 3, wherein, in a case in which the front vehicle seat is in the recumbent position and the seat occupant of the front vehicle seat unbuckles the rear seat belt, the control device generates a warning signal and/or adjusts the backrest to a normal position with a greater tilt angle.

11. The vehicle according to claim 3, wherein, in a case in which the front vehicle seat is in the recumbent position and the seat occupant of the front vehicle seat switches from the rear to the front seat belt, the control device generates a warning signal and/or adjusts the backrest to a normal position.

12. The vehicle according to claim 3, wherein, in a case in which the front vehicle seat is in the recumbent position and the seat occupant is buckled in with the rear seat belt, the control device locks a vehicle door assigned to the rear vehicle seat.

13. A method for tilt adjustment of the backrest of a vehicle seat to a recumbent position in a vehicle having at least one vehicle seat with a tilt-adjustable backrest, the method comprising:
   controlling, at a request of a seat occupant, the backrest to a recumbent position with a greater tilt angle;
   detecting at least one belt parameter that is used to determine whether a proper belt route of a seat belt fastened to the seat occupant is assured in the recumbent position; and
   in determining a proper belt route, releasing or preventing an adjustment actuation of the backrest to the recumbent position.

14. A vehicle, comprising:

a front vehicle seat with a tilt-adjustable backrest, the front vehicle seat having a seat belt arrangement, which has a front seat belt and a rear seat belt, the front seat belt disposed adjacent to the front vehicle seat and the rear seat belt disposed behind the front vehicle seat; and a control device controllable to move the tilt-adjustable backrest to a recumbent position, wherein in the recumbent position, the rear seat belt is adapted to be fastened to a seat occupant of the front vehicle seat.

15. A vehicle, comprising:

a vehicle seat with a tilt-adjustable backrest and a seat belt;

a control device controllable to adjust the tilt-adjustable backrest to a recumbent position; and a monitoring device having a signal connection to the control device, the monitoring device configured to determine whether a proper belt route of the seat belt is assured in the recumbent position, wherein, in determining a proper belt route, the monitoring device releases or prevents an adjustment actuation of the backrest to the recumbent position.

\* \* \* \* \*